Patented Feb. 24, 1942

2,273,825

UNITED STATES PATENT OFFICE 2,273,825

LEAD ALUMINATE PIGMENTS AND PAINTS AND METHOD OF MAKING SAME

Louis E. Barton, Windsor, Conn.

No Drawing. Application January 31, 1940, Serial No. 316,519

19 Claims. (Cl. 23—110)

My invention relates generally to pigments, their preparation and application, and more specifically to a new and improved type of opaque white pigments—stabilized aluminates of lead—together with improved methods of making same and their application in paints.

In my co-pending application for patent Serial No. 270,013 filed in the United States Patent Office April 25, 1939, I have described a process of making lead aluminate pigments which in brief consists in heating a mixture of lead and aluminum oxides at suitable temperatures until they chemically combine in the solid phase to form white lead aluminate. The product so made, or after wet milling and drying, may be used as pigment for paint and other purposes, but I have also disclosed, in my patent application referred to, that if in the preparation of the lead aluminate either aluminum hydrate or gamma aluminum oxide is used the lead aluminate pigment will be relatively unstable. Such instability is shown by discoloration and excessive hydration when the pigment is long exposed to the action of water and by gradual decomposition and discoloration of the pigment when kept in storage. I have also disclosed in my patent application referred to that lead aluminates free from the instability effects described can be prepared by calcining the alumina at temperatures above 900° C. before it is used in the preparation of lead aluminate.

In my co-pending application for patent Serial Number 264,583 filed in the United States Patent Office March 28, 1939, I have disclosed a process of making stable lead aluminates which are not subject to the decomposition and discoloration effects before referred to which in brief consists in heating a mixture of lead and aluminum oxides to formation of white lead aluminate in the solid phase and then thoroughly washing the pigment with water and drying it. The resulting stabilized hydrated lead aluminate is suitable for use as a pigment but if desired the combined water can be expelled by calcining the product for a few minutes at a very low red heat.

I have now discovered that if a small amount of silica, $SiO_2$, is added to a mixture of such lead and aluminum compounds as will, upon heating, supply to the product only lead and aluminum oxides and the mixture is then heated until the oxides chemically combine in the solid phase, the resulting lead aluminate is a stable white product which will not discolor upon treatment with water nor when kept in storage.

A perfectly stable lead aluminate pigment has distinct advantages over the less stable product. As a product stable lead aluminate has the advantage in various applications in the arts, many of which require water or aqueous solutions or involve the use of water in preparation of the product, that there is no danger of excessive hydration or possible discoloration. In the process of manufacturing lead aluminates the stable products have the distinct advantage that they may be handled in coninuous systems of wet-milling and classification which may subject the pigment to the action of water for many days.

My improved process of stabilizing lead aluminates with silica has a distinct advantage over the stabilizing processes disclosed in my co-pending patent applications Serial Numbers 270,013 and 264,583, referred to, as the steps of pre-calcination of the alumina in the former and washing of the lead aluminate in the latter can be dispensed with.

I have furthermore discovered that an improved lead aluminate pigment can be made by controlled hydration of the stabilized product after calcination. The control of hydration is accomplished by regulation of the time during which the lead aluminate is subjected to the action of water as in the wet-milling and classification steps. However, as will be seen from examples given later, the hydration is not necessarily proportional to the time treated with water but apparently depends also on the quality and condition of materials and their treatment in process; therefore for any stock of materials and combination of factors the time treated with water would be varied as determined by trial to give the degree of hydration desired.

I prefer to hydrate the lead aluminate to the extent of 0.25 to 2.00 for, while for some purposes anhydrous pigment or pigment hydrated to a greater extent may be desired and can be made as shown by examples later, I have found that lead aluminate pigments hydrated as indicated are, as compared with anhydrous products of better hiding power and greatly improved in dispersion properties and wettability with vehicles, such as linseed oil. When mixed and ground the pigment and vehicle readily combine to form a smooth paste, which upon further dilution with the vehicle forms a paint of creamy consistency that works easily under the brush and spreads to an even film in which the dispersion of pigment particles is remarkably uniform.

By my improved process I can make normal and basic lead aluminate, $PbAl_2O_4$ and $Pb_2Al_2O_5$, or lead aluminates of intermediate basicity such as $Pb_3Al_4O_9$, or subnormal lead aluminates approximating the molecular formulae PbO.2Al₂O₃ and PbO.3Al₂O₃, but in case of subnormal lead aluminates I prefer those containing not less than 40% lead oxide which are not too low in hiding power and are still essentially pure lead aluminates. I can prepare by my methods aluminates of any desired composition, or containing an excess of either alumina or the basic element; the various aluminates, basic, sub-basic, normal and subnormal adjusting during the heating process proportionally in the product in accordance with natural laws to the state of most stable equilibrium. In case either the aluminum or the basic element is in large excess, it is conceivable that the product would contain some of that oxide in physical combination.

By the expression "essentially pure lead aluminates" in this application I mean lead aluminates consisting preponderatingly of chemically combined lead and aluminum oxides, not more than 5% of silica as stabilizer and no other oxides than lead, aluminum and silicon except it be traces of impurities derived from raw materials or equipment used in the process and combined water in the case of hydrated lead aluminates.

Before giving specific examples of my invention, I will first give a general description of my improved methods covering certain features which are common in the preparation of all my lead aluminate pigments.

As a source of aluminum oxide, I can use alumina (Al₂O₃) or any aluminum compound which upon heating yields aluminum oxide, such as aluminum hydrate or aluminum nitrate. As a source of lead oxide, I can use the oxide as such, or any compound of lead that will yield the required oxide upon heating. For example, in the preparation of lead aluminate I may use either litharge (PbO), or red lead (Pb₃O₄), or lead peroxide (PbO₂), or white lead (2PbCO₃.PbH₂O₂). As a source of silica I can use either the natural, finely powdered material or the artificially prepared silica in anhydrous or hydrated form.

I thoroughly mix the aluminum and lead compounds and silica, preferably by first blending the alumina and the small amount of silica and then adding the lead oxide and further blending. I blend the materials in the required proportions either by dry-milling, or, preferably, by wet-milling, thereby reducing particle size and also assuring a very close association of the ingredients. The milling may be done either in a batch or a continuous type of mill; in either case I prefer to use a porcelain or silex lining to avoid contamination of materials. The slurry from wet-mill is dewatered as by settling and decantation and/or filtration. Any suitable equipment may be used: for example, Dorr tanks and filter presses.

The wet pulp prepared as described, may be charged directly into the heating furnace or may be first dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. Whatever the type of furnace, means should be provided for close control of temperature as the upper limit of temperature range for lead aluminates is but little below the fusion point of lead oxide and lead aluminate. In furnaces where products of combustion contact the charge a neutral or oxidizing flame should be maintained to avoid possible reduction of metallic oxides.

The time required in the calcining zone depends upon the temperature. The higher the temperature within the permissible range, of 700 to 880° C., the shorter the time. There is, however, tendency to clearer color tones at the lower and medium temperatures within the permissible range. Lead aluminate sinters and fuses, if the upper limit of temperature range is exceeded for a considerable length of time.

I have found that the small amount of silica added to stabilize the lead aluminate also permits the use of slightly lower temperatures and yields pigments of improved whiteness. For example, a charge proportioned for normal lead aluminate and containing 2% silica after heating for 21 hours at 650 to 700° C. was still somewhat colored although the reaction was nearing completion. At a temperature of 725 to 750° C. the reaction is complete in 8 hours. For economy in operation a temperature range of 750 to 820° C. is satisfactory but I prefer a temperature range of 780 to 820° C. for any of the lead aluminates when made by the process described.

The progress of the reaction during calcining may be readily judged by withdrawing a small sample from the furnace for observation. The lead aluminates will be colored when the reaction is incomplete, but will be substantially white in either hot or cold condition when the reaction is complete.

Some of the lead aluminates are sufficiently fine, as discharged from the calcining furnace, if care has been used not to exceed the upper limit of the calcining temperature range, to be used as pigments for paints but usually milling is required to break down aggregates and also to reduce particle size.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

The following examples, 1 to 21, illustrate the working of my process, as applied to the various lead aluminates, and the properties of the resulting product in comparison with lead aluminates made without stabilizer.

In the Tables I, II, and III, Example Numbers 1, 5, 6, 10, 11 and 15, the mixtures were prepared by wet-milling the materials together and drying the mixtures. In all the other examples in the tables the mixtures were prepared by dry-milling the materials together.

In Example 10, aluminum oxide which had been calcined at 1000° C. was used. In all other examples in the Tables I, II, and III, aluminum hydrate was used to supply aluminum oxide to the mixtures.

From the results in Tables I, II and III it is evident that silica is an effective stabilizer, as will appear by comparing the examples in which the product treated with water remained white throughout the test of many hours, with Examples 1, 6 and 11 in which no stabilizer was used. Furthermore many of the products of the examples which are not discolored by water have been kept in storage for over two years and in no case have they shown any discoloration. Thus it is apparent that silica acts also to stabilize lead aluminate against that form of instability. Even 0.10% silica used in Example 9, though evidently insufficient in that particular case, had a definitely stabilizing effect, preventing discoloration in water for 77 hours as compared with an average period of about 40 hours for Examples 1, 6 and 11.

The small amount of silica used as a stabilizer is undoubtedly chemically combined with other ingredients of the pigment but the mechanism of the reaction whereby the lead aluminate is converted to stable form is not certainly known. One definite effect accompanying the stabilization is a retarding effect on the rate of absorption of combined water when the anhydrous pigment is treated with water as by wet-milling—an effect that permits control of hydration to yield a pigment of desired properties.

The amount of silica for stabilization and degree of stability can be varied according to the properties desired in the product. Enough silica can be used to perfectly stabilize the lead aluminate against discoloration by either water or when kept in storage; or a lesser amount of silica may be used which will prevent discoloration during a period amply sufficient to carry out such steps in the manufacture of the pigment as wet-milling and particle-size classification in continuous systems such as Dorr tanks. Such partially stabilized products would be satisfactory for use in oil paints and apparently would be free from discoloration in storage; but they could not be used for preparations containing water, such as water emulsion paints.

In general I prefer to use from one-half to two per cent of silica in the lead aluminate since such quantities usually give complete stability and such amounts do not greatly change the fundamental properties of the lead aluminate pigment which it is desired to retain. For this reason I prefer to use the least amount of silica which will accomplish the result and to limit the silica to not more than 5%. I have found that less silica is required to stabilize the basic lead aluminates than for the normal product and more silica is required for subnormal lead aluminates. However, from the results obtained, the amount of silica required to perfectly stabilize the lead aluminate cannot be definitely stated for it apparently depends upon quality of materials and to some extent upon details of preparation; but for any stock of materials and operating procedure the proper amount of stabilizer can be readily determined by trial.

*Table I*

|  | Example No. | | | | |
|---|---|---|---|---|---|
|  | 1 | 2 | 3 | 4 | 5 |
| Type of lead aluminate | Normal | Normal | Normal | Sub-basic | Normal. |
| Stabilizer, silica___percent | None | 5 | 1 | 2 | 2. |
| Temp. during heating___°C | 810-830 | 760-780 | 800-830 | 775-800 | 780. |
| Time heated___hours | 2 | 3 | 3 | 2 | 2. |
| Chemical composition, percent: |  |  |  |  |  |
| Lead oxide | 68.60 | 65.00 | 67.50 | 75.00 | 67.30. |
| Alumina | 31.40 | 30.00 | 31.50 | 23.00 | 30.70. |
| Silica |  | 5.00 | 1.00 | 2.00 | 2.00. |
| Color of product | White | Cream white | Cream white | White | White. |

EFFECT OF TREATMENT WITH WATER

|  | | | | | |
|---|---|---|---|---|---|
| Time to appearance of first discoloration___hours | 24 |  |  |  |  |
| Total time treated with water___do | 168 | 480 | 480 | 480 | 480. |
| Color after treatment with water | Very gray | White | White | White | White. |
| Combined water in treated product percent | 11.68 | 2.20 | 5.11 | 2.35 | 1.61. |

*Table II*

|  | Example No. | | | | |
|---|---|---|---|---|---|
|  | 6 | 7 | 8 | 9 | 10 |
| Type of lead aluminate | Normal | Normal | Normal | Normal | Normal. |
| Stabilizer-silica___percent | None | 0.5 | 0.25 | 0.10 | 2. |
| Temp. during heating___°C | 790-800 | 790-800 | 790-800 | 770-780 | 780. |
| Time heated___hours | 5 | 5 | 5 | 12 | 2. |
| Chemical composition, percent: |  |  |  |  |  |
| Lead oxide | 68.60 | 68.30 | 68.45 | 68.54 | 67.30. |
| Alumina | 31.40 | 31.20 | 31.30 | 31.36 | 30.70. |
| Silica |  | 0.50 | 0.25 | 0.10 | 2.00. |
| Color of product | Cream white | White | White | White | White. |

EFFECT OF TREATMENT WITH WATER

|  | | | | | |
|---|---|---|---|---|---|
| Time to appearance of first discoloration___hours | 36 |  | 90 | 77 |  |
| Total time treated with water___do | 168 | 168 | 168 | 168 | 240. |
| Color after treatment with water | Very gray | White | Grayish white | Distinctly gray | White. |
| Combined water in treated product percent | 11.06 | 0.56 | 5.48 | 8.46 | 0.39. |

Table III

|  | Example No. | | | | |
|---|---|---|---|---|---|
|  | 11 | 12 | 13 | 14 | 15 |
| Type of lead Aluminate | Normal | Normal | Basic | Basic | Normal. |
| Stabilizer—silica percent | None | 1.5 | 0.50 | 0.25 | 2. |
| Temp. during heating °C | 780–800 | 725–750 | 775–790 | 775–790 | 775–780. |
| Time heated hours | 4 | 8 | 7 | 7 | 3. |
| Chemical composition, percent: |  |  |  |  |  |
| Lead oxide | 68.60 | 67.70 | 81.00 | 81.20 | 67.30. |
| Alumina | 31.40 | 30.80 | 18.50 | 18.55 | 30.70. |
| Silica |  | 1.50 | 0.50 | 0.25 | 2.00. |
| Color of product | Cream white. | White | White | Cream white. | White. |

EFFECT OF TREATMENT WITH WATER

|  | | | | | |
|---|---|---|---|---|---|
| Time to appearance of first discoloration hours | 54 |  |  | 127 |  |
| Total time treated with water do | 168 | 168 | 168 | 168 | 720. |
| Color after treatment with water | Very gray | White | White | Slightly brown. | White. |
| Combined water in treated product percent | 10.36 | 3.10 | 0.78 | 2.52 | 1.32. |

EXAMPLE 16.—*Normal lead aluminate*

A mixture of 132 parts of aluminum hydrate, equivalent to 85.8 parts $Al_2O_3$, and 6 parts of silica was wet-milled for 3 hours. 208 parts of lead oxide, PbO, was then added, the mixture milled one hour longer, and the slurry dewatered and dried. The dry mixture was then heated at a temperature of 770 to 790° C. for two hours to formation of lead aluminate.

The white anhydrous lead aluminate was wet-milled for 1½ hours and then dewatered and dried.

Chemical composition of finished product was:

| | Per cent |
|---|---|
| Lead oxide | 68.33 |
| Aluminum oxide | 28.16 |
| Silica | 1.97 |
| Combined water | 1.54 |

A small portion of the finished pigment was treated with water for 168 hours, without any discoloration.

EXAMPLE 17.—*Normal lead aluminate*

A mixture of 28.5 parts of aluminum oxide, which had been prepared by calcining aluminum hydrate at 1000° C., and 2 parts of silica was wet-milled for 3 hours. 69.5 parts of lead oxide, PbO, were then added and the milling continued one hour longer. The slurry was dewatered and dried. The dry mixture was heated for 2½ hours at 770 to 780° C. to formation of lead aluminate.

The white anhydrous lead aluminate was wet-milled for 1¼ hours and then dewatered and dried.

Chemical composition of finished product was:

| | Per cent |
|---|---|
| Lead oxide | 68.10 |
| Aluminum oxide | 27.97 |
| Silica | 1.97 |
| Combined water | 1.96 |

A small portion of the finished pigment was treated with water for 240 hours without any discoloration.

EXAMPLE 18.—*Basic lead aluminate*

A mixture of 28.2 parts of aluminum hydrate, equivalent to 18.3 parts of $Al_2O_3$, and 0.5 part of silica was wet-milled together for 2 hours. 81.2 parts of lead oxide, PbO, were then added, the mixture wet-milled for one hour longer and the slurry dewatered and dried. The dry mixture was then calcined for 8 hours at 775 to 785° C. to formation of lead aluminate.

A small sample of the white anhydrous lead aluminate was treated with water for 240 hours without discoloration.

The main portion of the product was wet-milled for two hours, dewatered and dried.

Chemical composition of the finished pigment was:

| | Per cent |
|---|---|
| Lead oxide | 80.69 |
| Aluminum oxide | 18.18 |
| Silica | .49 |
| Combined water | .64 |

A small portion of the finished pigment showed no discoloration upon treatment with water for 240 hours.

EXAMPLE 19.—*Subnormal lead aluminate—Approximate molecular formula, $PbO.2Al_2O_3$*

A mixture of 71.5 parts of aluminum hydrate, equivalent to 46.5 parts of $Al_2O_3$, and 3 parts of silica was wet-milled together for 2 hours. 50.5 parts of lead oxide, PbO, were then added, the milling continued for one hour longer, and the slurry dewatered and dried. The dry mixture was then calcined for 8 hours at 725 to 750° C. to formation of lead aluminate.

A small portion of the white anhydrous lead aluminate was treated with water. After 120 hours the sample was very slightly gray. After 168 hours the sample was slightly gray and after drying contained by analysis 4.52% of combined water.

The main portion of the product was wet-milled for two hours, dewatered and dried.

Chemical composition of finished product was:

| | Per cent |
|---|---|
| Lead oxide | 50.00 |
| Aluminum oxide | 45.90 |
| Silica | 2.96 |
| Combined water | 1.14 |

A small portion of the finished pigment showed no discoloration upon treatment with water for 240 hours.

EXAMPLE 20.—*Normal lead aluminate*

A mixture of 48.2 parts of aluminum hydrate, equivalent to 31.4 parts $Al_2O_3$, and 2 parts of silica was first dry-milled to a fine intimate mixture. 78 parts of white lead, $2PbCO_3.PbH_2O_2$, equivalent to 68.6 parts of PbO, were then added and milling continued until thoroughly blended. The mixture was then heated for 2 hours at a temperature of 780 to 800° C. to formation of lead aluminate.

A small sample of the white anhydrous lead aluminate was treated with water for 168 hours without any discoloration.

EXAMPLE 21.—*Subnormal lead aluminate—Approximate molecular formula, $PbO.3Al_2O_3$*

A mixture of 97 parts of aluminum hydrate, equivalent to 60 parts of $Al_2O_3$, and 5 parts of silica were dry-milled to a fine intimate mixture. 40 parts of lead oxide, PbO, was then added and milling continued until thoroughly blended. The mixture was then heated for 2 hours at 850 to 870° C. to formation of lead aluminate.

A small sample of the white anhydrous lead aluminate was treated with water for 168 hours without discoloration.

Two classes of white pigments are generally recognized: (1) the opaque white pigments, such as white lead, zinc oxide, and titanium pigments which impart opacity and whiteness when mixed with oil or other organic vehicle; and (2) the extender pigments, such as whiting and china clay, which do not impart appreciable opacity when similarly mixed with vehicles.

The opaque pigments of class (1) are further sub-divided into two classes: (a) those which are reactive or capable of combining chemically or physico-chemically with ingredients of the vehicle, such as white lead and zinc oxide; and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My lead aluminate pigments belong to the class of opaque reactive pigments though they differ in degree of reactivity. This is quite apparent from the characteristics of paint film to be discussed later, but it is definitely indicated in the case of the basic lead aluminates by their capacity to accelerate the drying of raw linseed oil when mixed with it and spread as paint in a manner similar to the drying action of white lead. This is shown roughly in a quantitative way by the following test and results.

Mixtures of various lead aluminates and white lead carbonate were made with raw linseed oil using the same proportion of pigment to vehicle by volume. The mixtures were spread, as rather thick coatings, on a steel plate as nearly as possible at the same spreading rate. The time for the films to become dry to the touch was recorded in hours as follows:

| | Hours |
|---|---|
| Basic carbonate white lead | 52 |
| Normal lead aluminate | 110 |
| Basic lead aluminate ($Pb_3Al_4O_9$) | 47 |
| Basic lead aluminate ($Pb_2Al_2O_5$) | 36 |
| 50% basic lead aluminate ($Pb_2Al_2O_5$) 50% titanium barium pigment | 48 |

From these results, it will be noted that the normal lead aluminate, though accelerating the drying of linseed oil more than is the case with an inert pigment, is relatively feebly reactive, while the basic lead aluminates are more reactive than white lead. The result showing the accelerating action of basic lead aluminate when mixed with a titanium pigment is particularly important from a practical application standpoint as well as strongly indicating the reactive properties of lead aluminate.

The properties of lead aluminate pigments adapt them for application in oil, enamel, and lacquer type paints, and also for other purposes where white pigments are used, such as for rubber, linoleum and other floor coverings, printing ink, vitrified enamels etc., but the outstanding characteristic of lead aluminate pigments is their capacity to impart durability to paints.

I have discovered that paints made with my lead aluminate pigments ground with raw linseed oil vehicle are exceptionally durable when exposed to light and weather and impart improved durability where the lead aluminate is used in paint in admixture with other pigment, such as titanium pigment, white lead and zinc oxide, either with or without tinting and extender pigments.

I have furthermore discovered that paints made with lead aluminates give remarkable protection to iron and steel under exposure to light, weather and other influences. This result I attribute to the reactive nature of the pigments, the lead oxide or the excess lead oxide in the basic lead aluminates functioning like free oxides of lead, such as red lead which for many years has been used with linseed oil as paint where maximum protection of iron or steel is desired.

I claim as my invention:

1. The method of making a stable, opaque, white, lead aluminate pigment, which consists in making a mixture of silica and such lead and aluminum compounds as will, upon heating, supply to the product only lead and aluminum oxides in proportions to yield an essentially pure lead aluminate containing not less than 0.10% silica and then heating the mixture until the oxides chemically combine in the solid phase to form said pigment.

2. The method of making a stable, opaque, white, lead aluminate pigment, which consists in making a mixture of silica and such lead and aluminum compounds as will, upon heating, supply to the product only lead and aluminum oxides in proportions to yield an essentially pure lead aluminate containing not less than 0.10% silica and then heating the mixture in the temperature range 700 to 880° C. until the oxides chemically combine in the solid phase to form said pigment.

3. The method of making a stable, opaque, white, lead aluminate pigment which consists in making a mixture of silica, lead oxide and aluminum hydrate in proportions to yield an essentially pure lead aluminate containing not less than 0.10% silica and then heating the mixture until the oxides of lead, aluminum and silicon chemically combine in the solid phase to form said pigment.

4. The method of making a stable, opaque, white, lead aluminate pigment which consists in making a mixture of silica, lead oxide and aluminum hydrate in proportions to yield an essentially pure lead aluminate containing not less than 0.10% silica and then heating the mixture in the temperature range 700 to 880° C. until the oxides of lead, aluminum and silicon chemically combine in the solid phase to form said pigment.

5. The method of making a stable, opaque, white, lead aluminate pigment which consists in making a mixture of the oxides of lead, aluminum and silicon in proportions to yield an essentially pure lead aluminate containing not less than 0.10% silicate and then heating the mixture until the oxides chemically combine in the solid phase to form said pigment.

6. The method of making a stable, opaque, white, lead aluminate pigment which consists in making a mixture of the oxides of lead, aluminum and silicon in proportions to yield an essentially pure lead aluminate containing not less than 0.10% silicate and then heating the mixture in the temperature range 700 to 880° C. until the oxides chemically combine in the solid phase to form said pigment.

7. An essentially pure, stable, opaque, white, lead aluminate pigment containing 0.10 to 5% chemically combined silica.

8. An essentially pure, opaque, white, lead aluminate pigment not discolored by the action of water and containing 0.10 to 5 per cent chemically combined silica.

9. An essentially pure, opaque, white, lead aluminate pigment not discolored by the action of water, such pigment containing 0.10 to 5 per cent chemically combined silica and the balance lead and aluminum oxides in the proportions 40 to 81% lead oxide to 19 to 60% aluminum oxide.

10. An essentially pure, opaque, white, lead aluminate pigment, having improved resistance to discoloration by the action of water, such pigment containing 0.10 to 5% of chemically combined silica and the balance lead and aluminum oxides in the proportions of 40 to 81% lead oxide to 19 to 60% aluminum oxide.

11. The method of making an essentially pure, stable, opaque, white lead aluminate pigment which consists in making a mixture of such lead, aluminum and silicon compounds as will, upon heating, supply to the product only the oxides in proportions to yield a lead aluminate containing 0.10% to 5% silica and the balance lead and aluminum oxides in the proportions of 40 to 81% PbO to 19 to 60% $Al_2O_3$ and then heating the mixture until the oxides chemically combine in the solid phase to form said pigment.

12. The method of making an essentially pure, stable, opaque, white lead aluminate pigment which consists in making a mixture of such lead, aluminum and silicon compounds as will, upon heating, supply to the product only the oxides in proportions to yield a lead aluminate containing 0.10 to 5% silica and the balance lead and aluminum oxides in the proportions of 40 to 81% PbO to 19 to 60% $Al_2O_3$ and then heating the mixture in the temperature range 700 to 880° C. until the oxides chemically combine in the solid phase to form said pigment.

13. The method of making an essentially pure, stable, opaque, white lead aluminate pigment which consists in making a mixture of silica, lead oxide and aluminum hydrate in proportions to yield a lead aluminate containing 0.10 to 5% silica and the balance lead and aluminum oxides in the proportions of 40 to 81% PbO to 19 to 60% $Al_2O_3$ and then heating the mixture until the oxides chemically combine in the solid phase to form said pigment.

14. The method of making an essentially pure, stable, opaque, white lead aluminate pigment which consists in making a mixture of silica, lead oxide and aluminum hydrate in proportions to yield a lead aluminate containing 0.10 to 5% silica and the balance lead and aluminum oxides in the proportions of 40 to 81% PbO to 19 to 60% $Al_2O_3$ and then heating the mixture in the temperature range 700 to 880° C. until the oxides chemically combine in the solid phase to form said pigment.

15. The method of making an essentially pure, stable, opaque, white lead aluminate pigment which consists in making a mixture of the oxides of lead, aluminum and silicon in proportions to yield a lead aluminate containing 0.10 to 5% silica and the balance lead and aluminum oxides in the proportions of 40 to 81% PbO to 19 to 60% $Al_2O_3$ and then heating the mixture until the oxides chemically combine in the solid phase to form said pigment.

16. The method of making an essentially pure, stable, opaque, white lead aluminate pigment which consists in making a mixture of the oxides of lead, aluminum and silicon in proportions to yield a lead aluminate containing 0.10 to 5% silica and the balance lead and aluminum oxides in the proportions of 40 to 81% PbO to 19 to 60% $Al_2O_3$ and then heating the mixture in the temperature range 700 to 880° C. until the oxides chemically combine in the solid phase to form said pigment.

17. The method of making an essentially pure, stable, opaque, white lead aluminate pigment which consists in making a mixture of such lead, aluminum and silicon compounds as will, upon heating, supply to the product only the oxides in proportions to yield a lead aluminate containing not less than 0.10% silica, heating the mixture until the oxides chemically combine in the solid phase to form said pigment and finally treating the calcined pigment with water to hydrate same.

18. An essentially pure, stable, opaque, white, hydrated lead aluminate pigment containing 0.10 to 5% chemically combined silica.

19. An essentially pure, stable, opaque, white, hydrated lead aluminate pigment containing 0.10 to 5% chemically combined silica and 0.25 to 2.00% of combined water.

LOUIS E. BARTON.